US008826787B2

(12) United States Patent
Hoover et al.

(10) Patent No.: US 8,826,787 B2
(45) Date of Patent: Sep. 9, 2014

(54) CUTTING MACHINE MEDIA FEEDER SYSTEM WITH FIXED IN-FEED AND OUT-FEED TRAYS

(75) Inventors: Linn C. Hoover, Webster, NY (US); Barry P. Mandel, Fairport, NY (US); Robert A. Clark, Williamson, NY (US); William W Nowak, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 106 days.

(21) Appl. No.: 13/591,285

(22) Filed: Aug. 22, 2012

(65) Prior Publication Data

US 2014/0053698 A1 Feb. 27, 2014

(51) Int. Cl.
*B62D 7/06* (2006.01)

(52) U.S. Cl.
USPC ... 83/100; 83/401; 83/614; 83/78; 414/752.1; 414/797

(58) Field of Classification Search
USPC ............. 414/795.4, 795.8, 796.5, 796.9, 797; 83/614, 401, 743, 78, 100, 23, 29; 269/21, 55, 56
See application file for complete search history.

(56) References Cited

U.S. PATENT DOCUMENTS

| | | | | |
|---|---|---|---|---|
| 4,487,409 | A * | 12/1984 | Orii | 271/267 |
| 4,709,605 | A * | 12/1987 | Clark | 83/23 |
| 4,804,173 | A * | 2/1989 | Pol et al. | 271/11 |
| 5,049,030 | A * | 9/1991 | Lockert | 414/788.7 |
| 5,120,178 | A * | 6/1992 | Ito | 414/222.07 |
| 5,358,375 | A * | 10/1994 | Kawada et al. | 414/277 |
| 5,765,984 | A * | 6/1998 | Stefano et al. | 414/222.08 |
| 6,006,638 | A * | 12/1999 | Eltringham | 83/86 |
| 6,055,895 | A * | 5/2000 | Kanazawa | 83/24 |
| 6,422,801 | B1 * | 7/2002 | Solomon | 414/416.07 |
| 6,729,837 | B1 * | 5/2004 | Ono et al. | 414/797 |
| 6,886,827 | B2 * | 5/2005 | Dachtler | 271/106 |
| 7,131,361 | B2 * | 11/2006 | Nakajima | 83/100 |
| 7,792,609 | B2 * | 9/2010 | Strasser et al. | 700/258 |
| 2010/0266380 | A1 * | 10/2010 | Dorner et al. | 414/797 |

* cited by examiner

*Primary Examiner* — Kaitlin Joerger
(74) *Attorney, Agent, or Firm* — Alix, Yale & Ristas, LLP

(57) ABSTRACT

A media feeder system for use with a media cutting system having a cutting table includes an upper out-feed tray and a lower in-feed tray bins are disposed laterally adjacent one side of the cutting system table. A bi-directional media transport system transports media in an in-feed direction from the in-feed tray to the cutting table surface and removes media from the cutting table surface in an out-feed direction from the cutting table surface to the out-feed tray. The media transport system includes a sheet acquisition system having gripping apparatus that adjust for a height of the media held in the bins.

24 Claims, 11 Drawing Sheets

CUTTING MACHINE MEDIA FEEDER SYSTEM WITH FIXED IN-FEED AND OUT-FEED TRAYS

BACKGROUND

This disclosure relates generally to cutting machines. More particularly, the present disclosure relates to low cost cutting machines such as X Y or X Theta cutting/creasing finishing machines.

Digital printing for low volume personalized packaging is a growing market segment. In one conventional method of producing personalized packaging, printing and/or images are printed on sheet media, a two-dimensional package blank is then cut from the sheet media and the package blank is then formed into a three-dimensional package.

There are a growing number of low cost X Y or X Theta (Θ) cutting/creasing finishing machines entering the market place. All the cutters priced under $20,000 offer only manual feeding and removal of media. Small print shops are investing in these cutters to enter the personalized packaging/transactional market only to find the labor costs associated with a dedicated operator to manually load and unload media from these cutters diverts resources from their normal work flow and decreases their profit margins for personalized packaging.

SUMMARY

There is provided a media feeder system for use with a media cutting system having a cutting table and cutting apparatus to cut or score media held on a surface of the cutting table. The media feeder system comprises multiple vertically displaced bins and a bi-directional media transport system. The bins are disposed laterally adjacent one side of the cutting system table and include at least a lower bin and an upper bin. The lower bin defines an in-feed tray to hold media to be fed to the cutting table surface and the upper bin defines an out-feed tray to hold media removed from the cutting table surface. The bi-directional media transport system transports media in an in-feed direction from the in-feed tray to the cutting table surface and removes media from the cutting table surface in an out-feed direction from the cutting table surface to the out-feed tray. The media transport system includes a sheet acquisition system having gripping apparatus that adjust for a height of the media held in the bins.

The in-feed and out-feed trays have fixed vertical positions. The in-feed tray has a media support surface that is positioned 30 to 80 mm below the cutting table surface. The out-feed tray has a media support surface positioned greater than 50 mm above the in-feed tray media support surface.

The out-feed tray may be laterally offset behind the lead edge of the in-feed tray.

The media feeder system further comprises first and second slide rails that extend over the bins and the cutting system table. The sheet acquisition system is movably mounted to the rails.

The sheet acquisition system also has a gantry extending longitudinally from the first slide rail to the second slide rail, with the gantry being movably mounted to the slide rails.

The sheet acquisition system also has a gantry drive connected to the gantry. The gantry drive laterally moves the gantry along the slide rails in the in-feed direction and in the out-feed direction.

The sheet acquisition system also has at least one gripping apparatus for gripping media mounted to the gantry.

The sheet acquisition system also has a drive shaft connected to each gripper apparatus, and a drive connected to the drive shaft.

Each gripping apparatus includes a gripper, and a linkage. A proximal end of the linkage is connected to the drive shaft and a distal end of the linkage is rotatably connected to the gripper.

If the gripper is a vacuum gripper, the gripping apparatus includes a spring buffer, and the sheet acquisition system includes a vacuum sensor. The in-feed tray may have at least one opening disposed proximate to the gripper.

The media feeder system may further comprise a cam or crank arm connected to the out-feed tray and articulating arm connected to the drive shaft. The articulating arm activates the cam or crank arm to raise a front edge of the out-feed tray when the gripping apparatus is lowered to acquire the media and the articulating arm resets the cam or crank arm to lower the front edge of the out-feed tray after the gripping apparatus places the media on the cutting table.

There is provided a method of loading and unloading media from a surface of a cutting table of a cutting system using a media feeder system. The media feeder system includes multiple vertically displaced bins disposed laterally adjacent one side of the cutting table and a bi-directional media transport system. The bins including at least a lower bin and an upper bin, the lower bin defining an in-feed tray to hold media to be fed to the cutting table surface, the upper bin defining an out-feed tray to hold media removed from the cutting table surface. The media transport system includes a gantry and a gripper apparatus connected to the gantry. The gripper apparatus has at least one gripper adapted to grip media.

The method comprises positioning the gantry over the media held in the in-feed tray. The gripper apparatus is lowered from a home position until the grippers acquire a media sheet. The gripper apparatus and the media sheet are then raised. The media sheet is transported with the gantry in a lateral in-feed direction from the in-feed tray to over the cutting table. The media sheet is then released onto the surface of the cutting table and the gantry is moved from over the cutting table. The gantry is repositioned over the media sheet after completion of cutting system operation. The gripper apparatus is lowered until the grippers acquire the media sheet from the surface of the cutting table. The gripper apparatus and the media sheet are then raised up from the cutting table. The sheet of media sheet is transported in a lateral out-feed direction from the cutting table to over the out-feed tray and released onto the out-feed tray.

Positioning the gantry over the media held in the in-feed tray comprises determining the position of the gantry and actuating a gantry drive of the transport system to move the gantry to a feeder pick position if necessary.

Transporting the sheet of media with the gantry in a lateral in-feed direction from the in-feed tray to over the cutting table comprises actuating a gantry drive to move the media sheet in the in-feed direction until a trailing edge of the media sheet passes a sensor and moving the gantry a predetermined distance in the in-feed direction whereby the trailing edge of the media sheet is positioned at a lead edge of a vacuum or electrostatic portion of the cutting table. The gantry travel can be randomly varied 1-2 mm in the in-feed direction with regard to the trailing edge sensor to vary the position of the media sheet on the cutting table and corresponding media cutting path. Random variation in the cutting path minimizes damage to the vacuum or electrostatic portion of the cutting table by the cutting blade from cutting multiple media sheets with the same cutting template.

Moving the gantry from over the cutting table comprises returning the gripper apparatus to an upper home position and actuating the gantry drive to move the gantry in the out-feed direction whereby the gantry is positioned over the bins.

Positioning the gantry over the media sheet after completion of cutting system operation comprises actuating the gantry drive to move the gantry in the in-feed direction until the gripper apparatus are positioned over a trailing edge of the media sheet on the cutting table.

Transporting the sheet of media sheet in a lateral out-feed direction comprises actuating the gantry drive to move the gantry in the out-feed direction until a trailing edge of the media sheet is positioned at a rear of the out-feed tray.

Lowering the gripper apparatus from a home position until the grippers acquire a media sheet comprises actuating the drive of the gripping apparatus to articulate the gripper down from an upper home position.

If the gripper is a vacuum gripper, the gripper apparatus also includes a spring buffer and a vacuum sensor, and acquiring a media sheet comprises articulating the gripper down from the home position until the vacuum sensor senses a preset vacuum level and articulating the gripper down an additional preset distance whereby the spring buffers are compressed.

Raising the gripper apparatus and the media sheet comprises actuating the drive to articulate up the gripper and a lead edge of the media sheet lead up a predetermined distance.

Releasing the media sheet onto the surface of the cutting table comprises actuating the drive to articulate the gripper and the media sheet downward, actuating the gripper to release the media sheet and actuating the drive to articulate up the gripper to the home position.

Lowering the gripper apparatus until the grippers acquire the media sheet from the surface of the cutting table comprises actuating the drive to articulate down the gripper toward the cutting table and actuating the gripper to acquire the media sheet.

Releasing the sheet of media onto the out-feed tray comprises actuating the grippers to release the media sheet.

BRIEF DESCRIPTION OF THE DRAWINGS

The present disclosure may be better understood and its numerous objects and advantages will become apparent to those skilled in the art by reference to the accompanying drawings in which.

DETAILED DESCRIPTION

Figure 1:
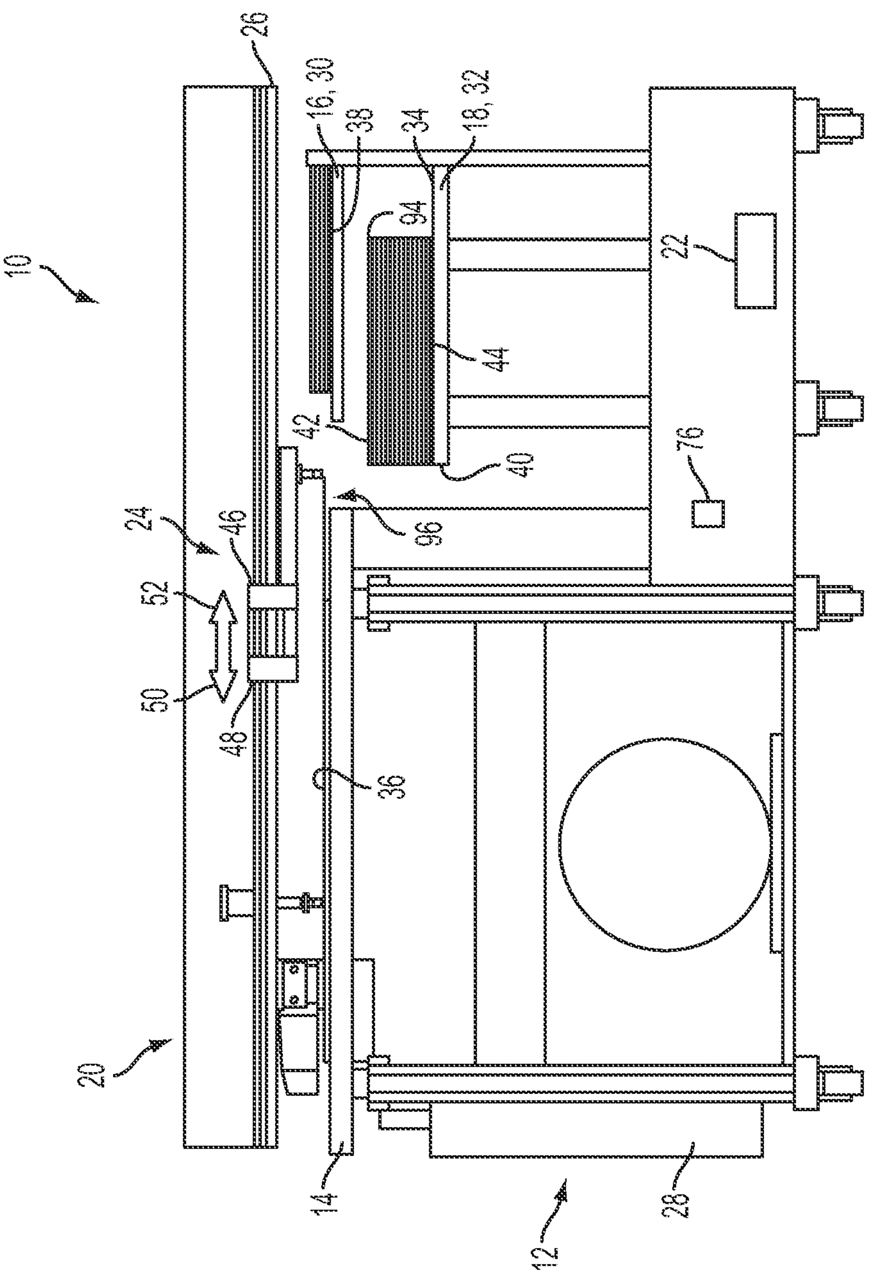
FIG. 1 is a front schematic partial view of a cutting system and a media feeder system in accordance with the present disclosure.
Figure 2:
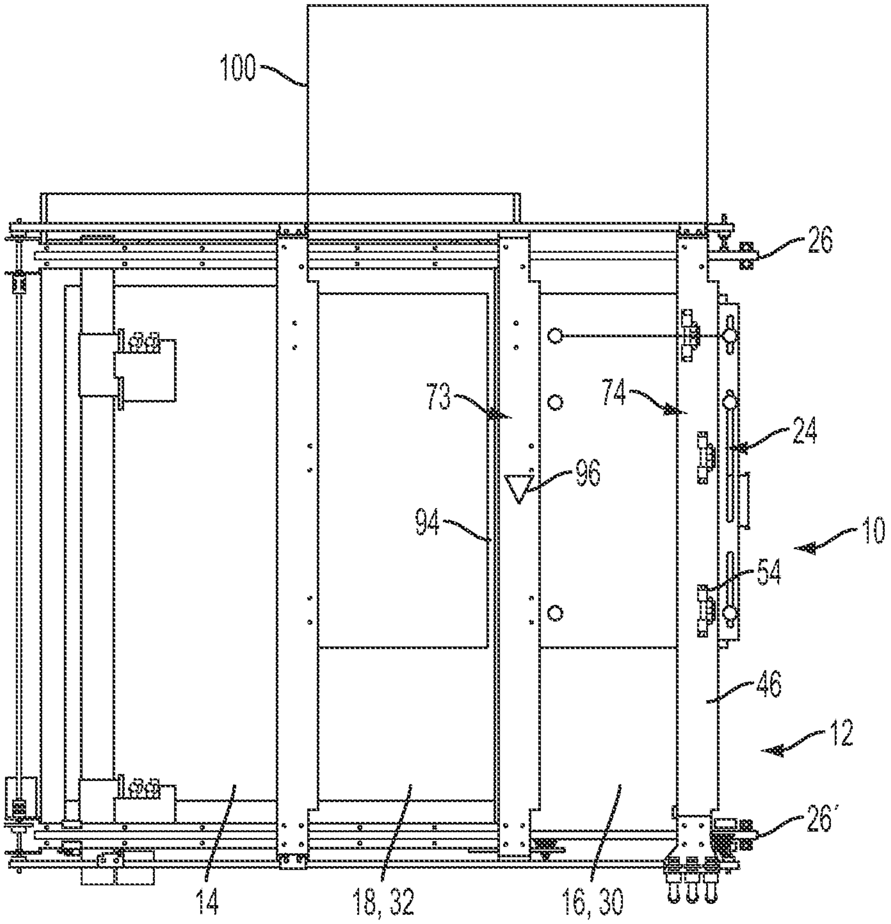
FIG. 2 is a simplified top view of the cutting system and media feeder system of FIG. 1.
Figure 3:
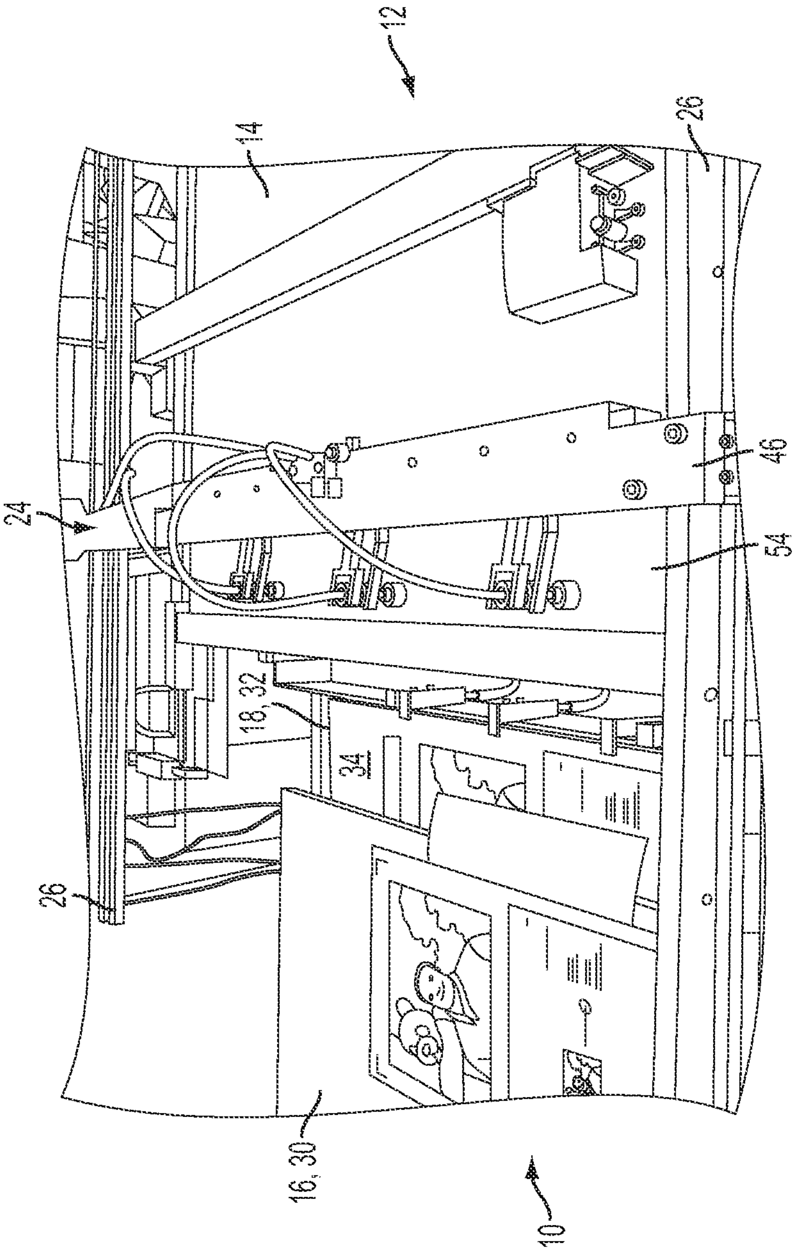
FIG. 3 is a simplified perspective view of a portion of the cutting system and media feeder system of FIG. 1.
Figure 4:
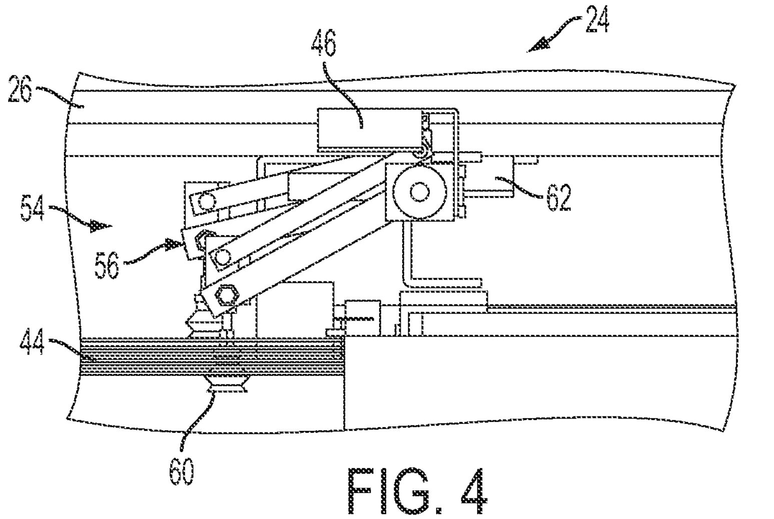
FIG. 4 is an enlarged side view of the transport system of FIG. 1, showing the gripping device articulating from the down position to the up position over the feed tray.
Figure 5:
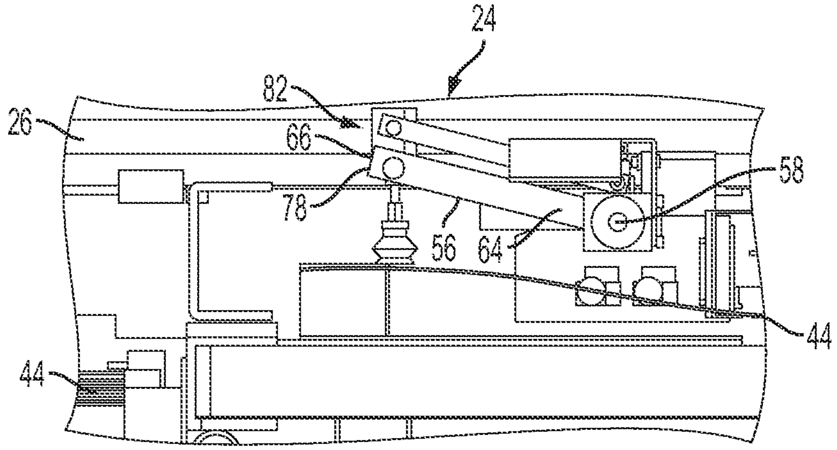
FIG. 5 is an enlarged side view of cutting table and the feeding assembly of FIG. 1, showing the gripping device in the up position to load or unload media from the cutting table.
Figure 6:
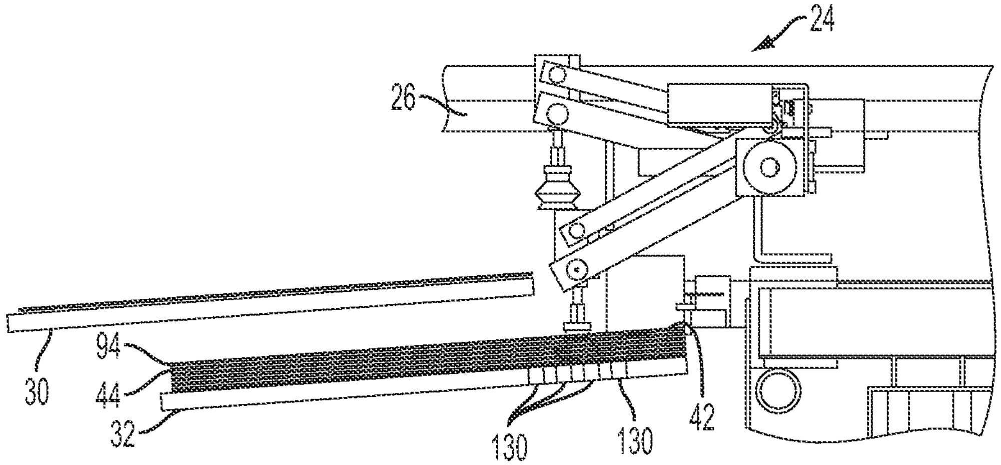
FIG. 6 is an enlarged side view of the in-feed tray, the out-feed tray and the transport system of FIG. 1, showing the gripping device articulating from the up position to the down position to pick media from the in-feed tray.

With reference to FIGS. 1-3, the subject media feeder system 10 automates the process of supplying and removing media/stock from conventional low cost cutting systems 12, such as X Y or X Theta (Θ) cutting/creasing finishing systems. The system 10 adds automatic feed-on and feed-off functions to a table based cutting system 12, such as the FC2250 series cutting systems by Graphtec Corporation, capable of performing customized cutting or scoring operations on sheet media. Such conventional systems 12 typically require that the operator manually feed media onto and off of the cutting table 14.

The media feeder system 10 includes multiple bins 16, 18, a media transport system 20 and a controller 22. To minimize the footprint of the media feeder system 10 and avoid interference with the cutting system 12, the bins 16, 18 are positioned on one side of the cutting table 14 and are stacked in a vertically displaced arrangement. The media transport system 20 includes a sheet acquisition system 24 that is movably mounted to a pair of slide rails 26, 26' that extend over the bins 16, 18 and the cutting table 14.

Figure 8:
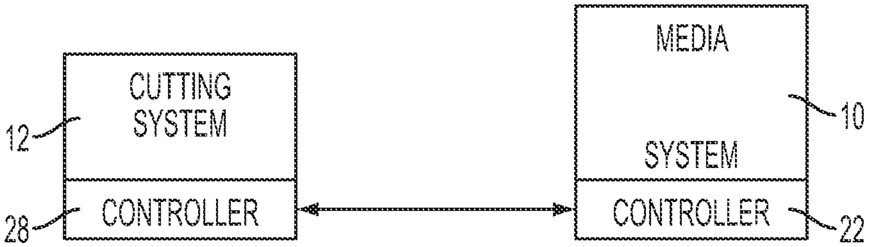
FIG. 8 is a simplified schematic view of the cutting system and the media feeder system of FIG. 1.
Figure 9A:
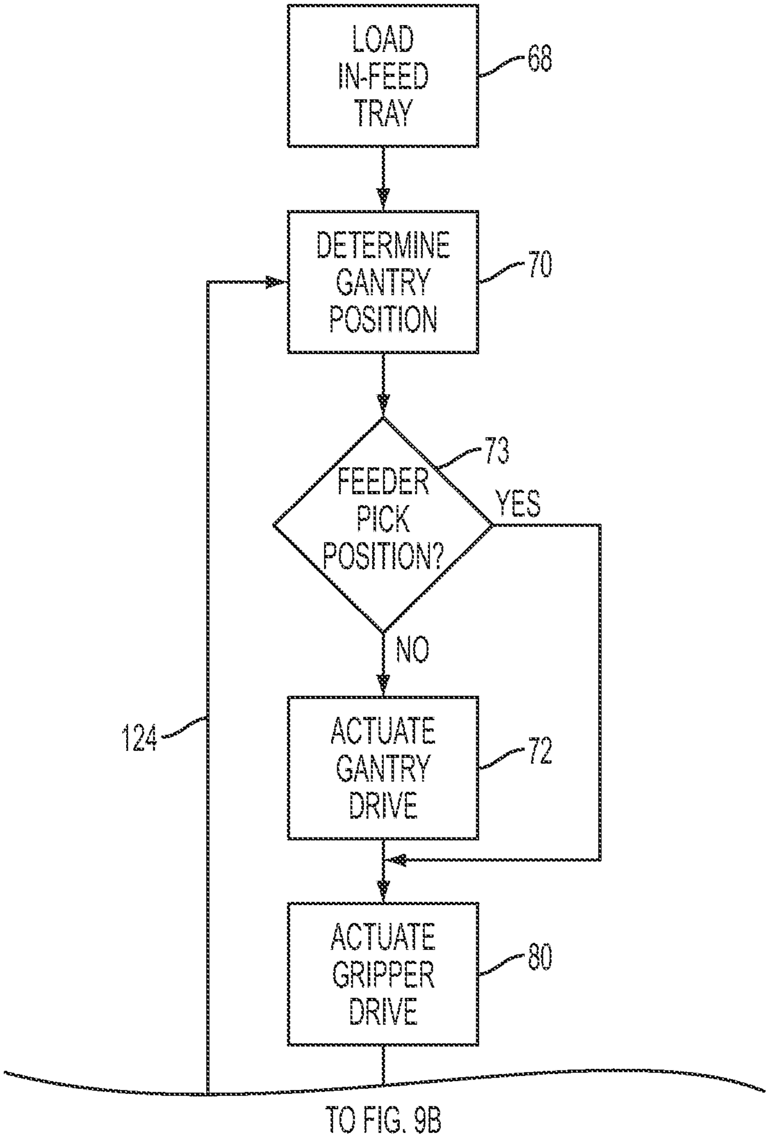
FIGS. 9*a* to 9*e* are a flow diagram of a method of feeding a cutting system in accordance with the disclosure.
Figure 9B:
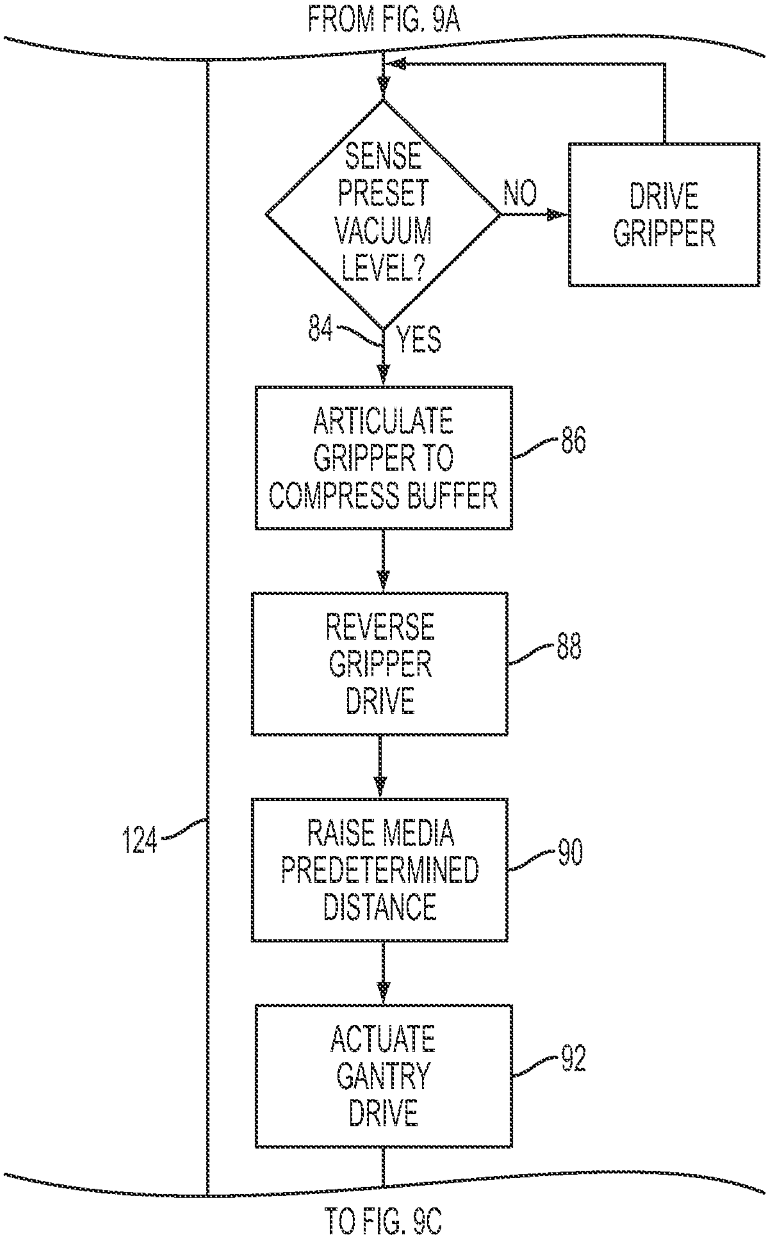
Figure 9C:
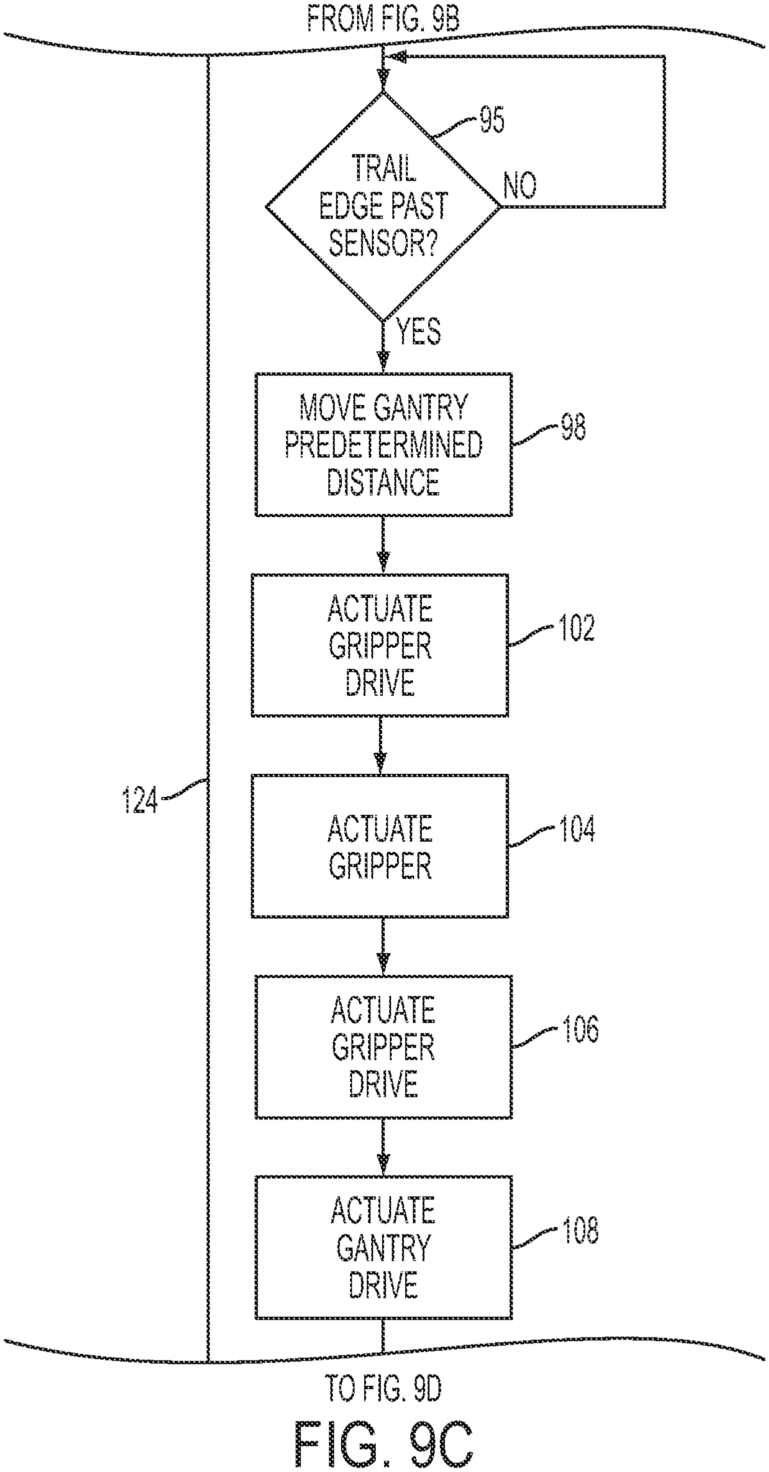
Figure 9D:
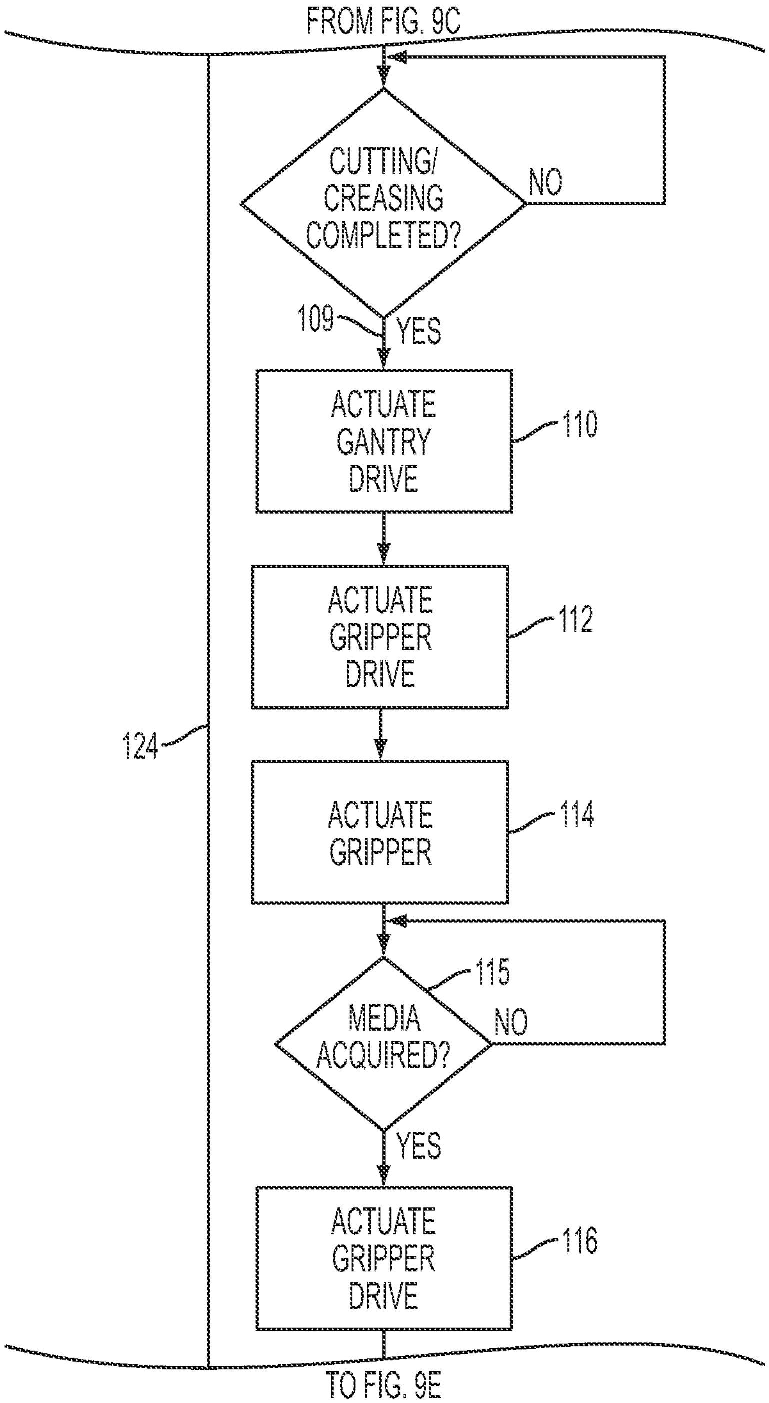
Figure 9E:
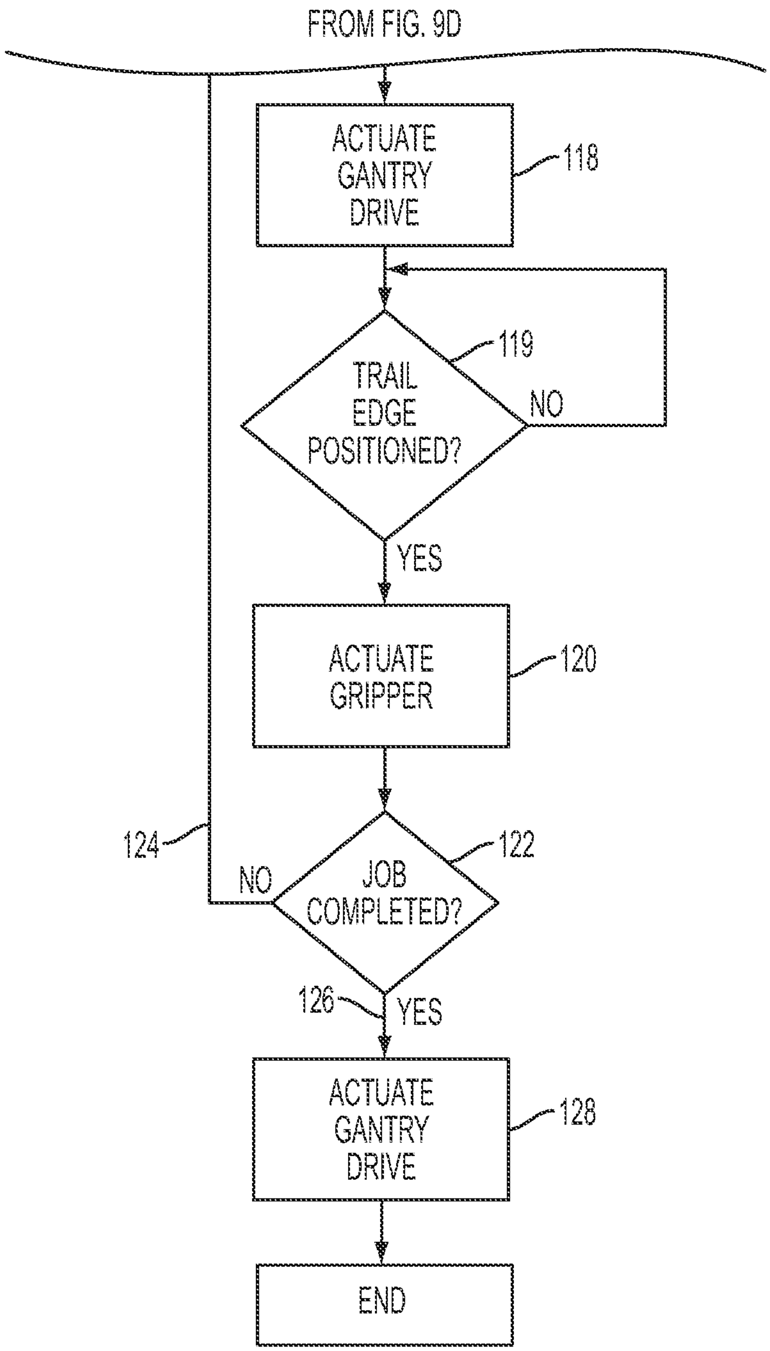

With reference to FIG. 8, the media feeder system 10 may be a modular system that cooperates with a separate cutting system. In this case, the system controller 22 of the media feeder system 10 may communicate with the controller 28 for the cutting system 12 such that operation of the media feeder system 10 is coordinated with operation of the cutting system 12 as described below. Alternatively, the media feeder system 10 may be integrated with the cutting system 12 into a single coordinated system having a single controller.

To facilitate understanding of the subject system 10 and method, the multiple bins 16, 18 described below include only a single upper bin 16, which functions as an out-feed tray 30 or stacking tray, and a single lower bin 18, which functions as an in-feed tray 32, where "out-feed tray" is hereby defined to be a tray in which media is deposited after processing and "in-feed tray" is hereby defined to be a tray from which media is taken for processing. Generally the trays are low capacity trays capable of holding approximately 50 sheets of 350-400 gsm media or approximately 100 sheets of 200-250 gsm media.

The in-feed and out-feed trays 32, 30 of the feeder system 10 are fixed in place, eliminating the need for expensive tray lift and positioning mechanisms. The lower in-feed tray 32 is positioned such that the media support surface 34 is located 30-80 mm below the cutting table surface 36. The upper out-feed tray 30 is positioned such that the media support surface 38 is substantially greater than 50 mm above the in-feed tray media support surface 34. The out-feed tray 30 is also laterally offset behind the lead edge 40 of the in-feed tray 32 to provide clearance for the sheet acquisition system 24 to access and acquire the lead edge 42 of the media 44 stored in the in-feed tray 32.

With additional reference to FIGS. 4-7, the sheet acquisition system 24 includes a gantry 46 that extends longitudinally from the first slide rail 26 to the second slide rail 26' and is movably mounted to the slide rails 26, 26'. A gantry drive 48 connected to the gantry 46 laterally moves the gantry 46 along the slide rails 26, 26' in an in-feed direction 50 and in an out-feed direction 52. One or more gripping apparatus 54 are mounted to the gantry 46. In the example shown in FIG. 3, three gripping apparatus 54 are spaced longitudinally along the gantry 46. Each gripping apparatus 54 includes a linkage 56 (for example a four bar linkage) which is mounted on a drive shaft 58 mounted to the gantry 46, and a gripper 60 (such as a vacuum gripper). Drive shaft 58 is driven by a drive 62, such as a stepper motor. The proximal end 64 of the linkage 56 is connected to the drive shaft 58 and the distal end 66 of the linkage 56 is rotatably connected to the gripper 60. The drive 62 is connected to the gantry 46 and the drive shaft 58 such that the drive 62 pivots the drive shaft 58 to articulate the linkage 56 and the gripper 60 over 100 mm to acquire media 44 from in-feed trays 32 and deposit media 44 onto out-feed trays that are vertically spaced over 50 mm apart. If the sheet acquisition system 24 includes multiple gripping apparatus 54, the gripping apparatus 54 are all mounted on a common drive shaft 58.

With additional reference to FIGS. 9*a*-9*e*, the media 44 to be fed to the cutting table 14 is loaded 68 into the in-feed tray 32. The controller 22 determines 70 the position of the gantry 46 and actuates 72 the gantry drive 48 to move 73 the gantry 46 from the gantry home position 74 to the feeder pick position 73 if necessary. The "feeder pick position" 73 is that position where the grippers 60 may acquire the lead edge 42 of the top media sheet 44 in the in-feed tray 32. The feeder pick position 73 can vary relative to the media lead edge 42 based on the media sheet 44 size and basis weight. If a vacuum gripper is used as the gripper 60, a vacuum sensor 76 and a spring buffer 78 may be used to control the gripper height. The spring buffer 78 maintains a constant normal force over 10 mm of height variation. The controller 22 initiates, which actuates 80 the drive 62 to articulate the gripper apparatus 54 down from a home position 82 until the vacuum sensor 76 senses a preset vacuum level, indicating the grippers 60 have acquired a media sheet 44. The controller 22 continues to actuate the drive such that the gripper is articulated 86 an additional preset distance, such as 2-5 mm, to compress the spring buffers 78 and ensure all grippers 60 have contacted the media 44.

The controller 22 then reverses 88 the drive 62 to raise 90 the gripper apparatus 54 and the media sheet lead edge 42 a predetermined distance to clear the cutting table 14. The controller 22 actuates 92 the gantry drive 48 to move the media 44 in the in-feed direction 50 until the media trail edge 94 passes 95 a sensor 96 (for example an optical reflective sensor). The controller 22 continues to actuate the gantry drive 48 to move 98 the gantry 46 a predetermined distance in the in-feed direction 50 to position the media trailing edge 94 at the lead edge 100 of the vacuum or electrostatic portion of the table 14. The controller 22 actuates 102 the drive 62 to lower the gripper apparatus 54 and the media 44 and then actuates 104 the gripper 60 to release the media 44 while the vacuum or electrostatic forces are applied. The controller 22 actuates 106 the drive 62 to return the gripper apparatus 54 to the home position 82 and then actuates 108 the gantry drive 48 to move the gantry 46 in the out-feed direction 52 such that the sheet acquisition system 24 is positioned over the feed trays 30, 32 and to the side of the table 14 during the cutting operation.

After 109 the media 44 is creased and/or cut, the controller 22 actuates 110 the gantry drive 48 to move the gantry 46 in the in-feed direction 50 until the gripper apparatus 54 are positioned over the trailing edge 94 of the media sheet 44. The controller 22 then actuates 112 the drive 62 to articulate the gripper apparatus 54 toward the table 14 and actuates 114 the gripper 60 to acquire the media sheet 44. When the controller 22 senses 115 that the media 44 has been acquired, as disclosed above, it actuates 116 the drive 62 to lift the media 44 clear of the cutter table 14 to the home position 82. The controller 22 then actuates 118 the gantry drive 48 to move the gantry 46 in the out-feed direction 52 until the media trailing edge 94 is positioned 119 at the rear of the out-feed tray 30. The controller 22 then actuates 120 the grippers 60 to release the media 44, which drops onto the out-feed tray 30 and the controller 22 checks 122 the cutting job to determine if the cutting job has been completed. If the cutting job has not been completed 124, the controller 22 determines 70 the position of the gantry 46 and actuates 72 the gantry drive 48 to return the gantry 46 to the feeder pick position 73 for the next media sheet 44. If the cutting job has been completed 126, the controller 22 actuates 128 the gantry drive 48 to return the gantry 46 to the gantry home position 74.

It should be appreciated that the gripping apparatus 54 automatically adjusts for differences in height of the media 44 disposed in the in-feed and out-feed trays 32, 30. More specifically, the grippers 60 are raised to the home position 82 after a media sheet 44 has been acquired, are retained in the home position 82 while the gantry 46 and media 44 are driven over the out-feed tray 30 and the media 44 is dropped into the out-feed tray and are retained in the home position 82 while the gantry 46 is returned to the gantry home position or the feeder pick position 73. Accordingly, the distance between the grippers 60 and the top media sheet 44 in the in-feed tray 32 is maximized when the gripping apparatus 54 is positioned to acquire the media sheet 44. Steps 80, 84 and 86 of the method ensure that the grippers 60 positively engage the upper surface of the top media sheet 44 in the in-feed tray 32 no matter how many sheets of media 44 are disposed in the in-feed tray 32.

It should also be appreciated that sheet acquisition system 24 may also be used to detect in-feed tray 32 empty conditions by forming openings 130 in the in-feed tray 32 directly under the vacuum grippers and monitoring the voltage or current to the vacuum blower or the pressure in the vacuum lines after the vacuum grippers 60 are lowered to acquire media 44 from the in-feed tray 32. If no media 44 is present in the in-feed tray 32, the vacuum level would not change after the gripper apparatus 54 was lowered by drive 62 a preset distance.

Figure 7:
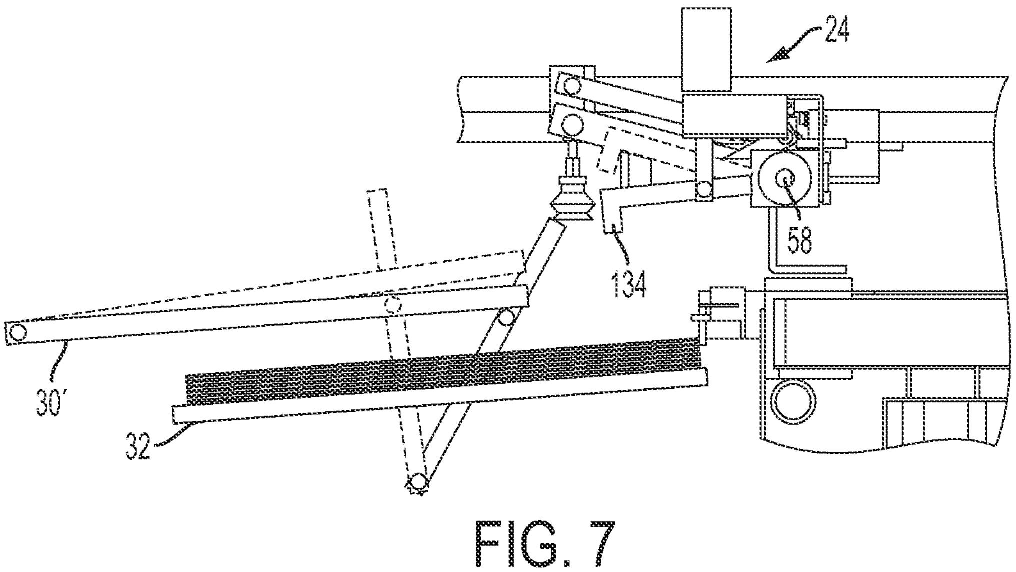
FIG. 7 is an enlarged side view of the in-feed tray and the transport system of FIG. 1 and an alternate version of the out-feed tray, showing the gripping device articulating from the up position to the down position to pick media from the in-feed tray and the out-feed tray pivoting to prevent interference with the acquired media sheet when it is lifted by the gripping device.

With reference to FIG. 7, in an alternate version of the out-feed tray 30', the out-feed tray 30' pivots to increase the clearance between the in-feed tray 32 and the out-feed tray 30' while the gripper 60 is acquiring a sheet 44. A cam or crank arm 132 mounted on the out-feed tray 30' is actuated by a separate articulating arm 134 mounted on the drive shaft 58. The articulating arm 134 is actuated by a mechanical drive such as a solenoid or vacuum cylinder. If the basis weight of the media sheet 44 input by the operator at the beginning of the cutting operation exceeds a certain value such as 150-200 gsm, the articulating arm 134 would be actuated to engage the cam or crank arm 132 which raises the front edge 136 of the out-feed tray 30'. This increases the clearance between the in-feed and out-feed trays 32, 30' during the feeding operation enabling the grippers 60 to pick heavier weight and stiffer media 44 without contacting the out-fee tray 30'. This increases the media weight range and tray capacity without increasing the clearance between the trays 30', 32.

After the grippers 60 place the media 44 on the cutter table 14 and the gantry 46 moves off the table 14 to the gantry home position 74 during the creasing/cutting operation, the articulating arm 134 resets the cam or crank arm 132 to lower the out-feed tray front edge 136 to facilitate depositing the media in the out-feed tray 30' after the creasing/cutting operation is complete.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A media feeder system adapted to be used with a media cutting system having a cutting table and cutting apparatus to cut or score media held on a surface of the cutting table, the media feeder system comprising:

a plurality of vertically displaced bins adapted to be disposed laterally adjacent one side of the cutting system table, the bins including at least a lower bin and an upper bin, the lower bin defining an in-feed tray adapted to hold media to be fed to the cutting table surface, the upper bin defining an out-feed tray adapted to hold media removed from the cutting table surface;

first and second slide rails adapted to extend over the bins and the cutting system table, a bi-directional media transport system adapted to transport media in an in-feed direction from the in-feed tray to the cutting table surface and remove media from the cutting table surface in an out-feed direction from the cutting table surface to the out-feed tray, the media transport system including a sheet acquisition system having a gantry extending longitudinally from the first slide rail to the second slide rail, the gantry being movably mounted to the slide rails, at least one gripping apparatus mounted to the gantry, a drive shaft connected to each gripping apparatus, and a drive connected to the drive shaft;

wherein each gripping apparatus includes:

a gripper, and a linkage, a proximal end of the linkage being connected to the drive shaft and a distal end of the linkage being rotatably connected to the gripper.

2. The media feeder system of claim 1 wherein the in-feed and out-feed trays have fixed vertical positions, the in-feed tray having a media support surface adapted to be positioned 30 to 80 mm below the cutting table surface, the out-feed tray having a media support surface positioned greater than 50 mm above the in-feed tray media support surface.

3. The media feeder system of claim 1 wherein the in-feed tray has a lead edge and the out-feed tray is laterally offset behind the lead edge of the in-feed tray.

4. The media feeder system of claim 1 wherein the sheet acquisition system also has a gantry drive connected to the gantry, the gantry drive being adapted to laterally moves the gantry along the slide rails in the in-feed direction and in the out-feed direction.

5. The media feeder system of claim 1 wherein the gripper is a vacuum gripper, the gripping apparatus includes a spring buffer, and the sheet acquisition system includes a vacuum sensor.

6. The media feeder system of claim 5 wherein the in-feed tray defines at least one opening disposed proximate to the gripper.

7. A media feeder system adapted to be used with a media cutting system having a cutting table and cutting apparatus to cut or score media held on a surface of the cutting table, the media feeder system comprising:

a plurality of vertically displaced bins adapted to be disposed laterally adjacent one side of the cutting system table, the bins including at least a lower bin and an upper bin, the lower bin defining an in-feed tray adapted to hold media to be fed to the cutting table surface, the upper bin defining an out-feed tray adapted to hold media removed from the cutting table surface;

first and second slide rails adapted to extend over the bins and the cutting system table, a bi-directional media transport system adapted to transport media in an in-feed direction from the in-feed tray to the cutting table surface and remove media from the cutting table surface in an out-feed direction from the cutting table surface to the out-feed tray, the media transport system including a sheet acquisition system having a gantry extending longitudinally from the first slide rail to the second slide rail, the gantry being movably mounted to the slide rails, at least one gripping apparatus mounted to the gantry, the gripping apparatus being adapted to grip media, a drive shaft connected to each gripping apparatus, and a drive connected to the drive shaft;

a cam or crank arm connected to the out-feed tray; and articulating arm connected to the drive shaft;

wherein the articulating arm activates the cam or crank arm to raise a front edge of the out-feed tray when the gripping apparatus is lowered to acquire the media and the articulating arm resets the cam or crank arm to lower the front edge of the out-feed tray after the gripping apparatus places the media on the cutting table.

8. The media feeder system of claim 7 further including a controller adapted to be in communication with a controller of the media cutting system.

9. The media feeder system of claim 7 wherein the in-feed and out-feed trays have fixed vertical positions, the in-feed tray having a media support surface adapted to be positioned 30 to 80 mm below the cutting table surface, the out-feed tray having a media support surface positioned greater than 50 mm above the in-feed tray media support surface.

10. The media feeder system of claim 7 wherein the in-feed tray has a lead edge and the out-feed tray is laterally offset behind the lead edge of the in-feed tray.

11. The media feeder system of claim 7 wherein the sheet acquisition system also has a gantry drive connected to the gantry, the gantry drive being adapted to laterally moves the gantry along the slide rails in the in-feed direction and in the out-feed direction.

12. A method of loading and unloading media from a surface of a cutting table of a cutting system performing a cutting job using a media feeder system including a plurality of vertically displaced bins disposed laterally adjacent one side of the cutting table and a bi-directional media transport system, the bins including at least a lower bin and an upper bin, the lower bin defining an in-feed tray adapted to hold media to be fed to the cutting table surface, the upper bin defining an out-feed tray adapted to hold media removed from the cutting table surface, the media transport system including a pair of rails extending from over the bins to over the cutting table and a sheet acquisition system movably mounted to the rails, the sheet acquisition system including a gantry, and a gripper apparatus connected to the gantry, the gripper apparatus having at least one gripper adapted to grip media, the method comprising:

a) positioning the gantry over the media held in the in-feed tray;
b) lowering the gripper apparatus from a home position until the grippers acquire a media sheet;
c) raising the gripper apparatus and the media sheet;
d) transporting the sheet of media with the gantry in a lateral in-feed direction from the in-feed tray to over the cutting table;
e) releasing the media sheet onto the surface of the cutting table;
f) moving the gantry from over the cutting table;
g) positioning the gantry over the media sheet after completion of cutting system operation, including
determining the position of the gantry, and
actuating a gantry drive of the transport system to move the gantry to a feeder pick position if necessary;
h) lowering the gripper apparatus until the grippers acquire the media sheet from the surface of the cutting table;
i) raising the gripper apparatus and the media sheet;
j) transporting the sheet of media sheet in a lateral out-feed direction from the cutting table to over the out-feed tray; and
k) releasing the sheet of media onto the out-feed tray;
wherein transporting the sheet of media with the gantry in a lateral in-feed direction from the in-feed tray to over the cutting table comprises:
actuating the gantry drive to move the media sheet in the in-feed direction until a trailing edge of the media sheet passes a sensor; and
moving the gantry a predetermined distance in the in-feed direction whereby the trailing edge of the media sheet is positioned at a lead edge of a vacuum or electrostatic portion of the cutting table.

13. The method of claim 12 wherein the predetermined distance is randomly varied 1-2 mm during a multiple sheet cutting job whereby damage to the vacuum or electrostatic portion of the cutting table is minimized.

14. The method of claim 12 wherein moving the gantry from over the cutting table comprises:
returning the gripper apparatus to an upper home position; and
actuating the gantry drive to move the gantry in the out-feed direction whereby the gantry is positioned over the bins.

15. The method of claim 12 wherein positioning the gantry over the media sheet after completion of cutting system operation comprises actuating the gantry drive to move the gantry in the in-feed direction until the gripper apparatus are positioned over a trailing edge of the media sheet on the cutting table.

16. The method of claim 12 wherein transporting the sheet of media sheet in a lateral out-feed direction comprises actuating the gantry drive to move the gantry in the out-feed direction until a trailing edge of the media sheet is positioned at a rear of the out-feed tray.

17. A method of loading and unloading media from a surface of a cutting table of a cutting system performing a cutting job using a media feeder system including a plurality of vertically displaced bins disposed laterally adjacent one side of the cutting table and a bi-directional media transport system, the bins including at least a lower bin and an upper bin, the lower bin defining an in-feed tray adapted to hold media to be fed to the cutting table surface, the upper bin defining an out-feed tray adapted to hold media removed from the cutting table surface, the media transport system including a gantry, a gripper apparatus connected to the gantry, the gripper apparatus including at least one vacuum gripper adapted to grip media and a spring buffer and a vacuum sensor, and a drive to articulate the grippers up and down, the method comprising:
a) positioning the gantry over the media held in the in-feed tray;
b) lowering the gripper apparatus from a home position until the grippers acquire a media sheet including
actuating the drive to articulate the gripper down from an upper home position,
articulating the gripper down from the home position until the vacuum sensor senses a preset vacuum level, and
articulating the gripper down an additional preset distance whereby the spring buffers are compressed;
c) raising the gripper apparatus and the media sheet;
d) transporting the sheet of media with the gantry in a lateral in-feed direction from the in-feed tray to over the cutting table;
e) releasing the media sheet onto the surface of the cutting table;
f) moving the gantry from over the cutting table;
g) positioning the gantry over the media sheet after completion of cutting system operation;
h) lowering the gripper apparatus until the grippers acquire the media sheet from the surface of the cutting table;
i) raising the gripper apparatus and the media sheet;
j) transporting the sheet of media sheet in a lateral out-feed direction from the cutting table to over the out-feed tray; and
k) releasing the sheet of media onto the out-feed tray.

18. The method of claim 17 wherein raising the gripper apparatus and the media sheet comprises actuating the drive to articulate up the gripper and a lead edge of the media sheet lead up a predetermined distance.

19. The method of claim 17 wherein releasing the media sheet onto the surface of the cutting table comprises:
actuating the drive to articulate down the gripper and the media sheet;
actuating the gripper to release the media sheet; and
actuating the drive to articulate up the gripper to the home position.

20. The method of claim 17 wherein releasing the sheet of media onto the out-feed tray comprises actuating the grippers to release the media sheet.

21. A media feeder system adapted to be used with a media cutting system having a cutting table and cutting apparatus to cut or score media held on a surface of the cutting table, the media feeder system comprising:
a plurality of vertically displaced bins having fixed vertical positions, the bins being adapted to be disposed laterally adjacent one side of the cutting system table and including at least a lower bin and an upper bin, the lower bin defining an in-feed tray adapted to hold media to be fed to the cutting table surface, the upper bin defining an out-feed tray adapted to hold media removed from the cutting table surface;
a bi-directional media transport system adapted to transport media in an in-feed direction from the in-feed tray to the cutting table surface and remove media from the cutting table surface in an out-feed direction from the cutting table surface to the out-feed tray, the media transport system including:
first and second slide rails adapted to extend over the bins and the cutting system table;
a sheet acquisition system having:

a gantry extending longitudinally from the first slide rail to the second slide rail, the gantry being movably mounted to the slide rails, a gantry drive connected to the gantry, to laterally move the gantry along the slide rails in the in-feed and out-feed directions, and at least one gripping apparatus mounted to the gantry, each gripping apparatus including:

a gripper adapted to grip media, and a linkage adapted to adjust for a height of the media held in the bins;

a drive shaft connected to each gripper apparatus, and a drive connected to the drive shaft;

wherein a proximal end of the linkage is connected to the drive shaft and a distal end of the linkage is rotatably connected to the gripper.

22. The media feeder system of claim 21 wherein the gripper is a vacuum gripper, the gripping apparatus also including a spring buffer, and the sheet acquisition system includes a vacuum sensor.

23. The media feeder system of claim 21 wherein the in-feed tray defines at least one opening disposed proximate to the gripper.

24. The media feeder system of claim 21 further comprising:

a cam or crank arm connected to the out-feed tray; and articulating arm connected to the drive shaft;

wherein the articulating arm activates the cam or crank arm to raise a front edge of the out-feed tray when the gripping apparatus is lowered to acquire the media and the articulating arm resets the cam or crank arm to lower the front edge of the out-feed tray after the gripping apparatus places the media on the cutting table.

* * * * *